United States Patent
Thomson et al.

(10) Patent No.: US 6,992,414 B2
(45) Date of Patent: *Jan. 31, 2006

(54) EMI SUPPRESSION IN PERMANENT MAGNET DC MOTORS HAVING PCB OUTSIDE MOTOR IN CONNECTOR AND OVERMOLDED

(75) Inventors: Kenneth Scott Thomson, Flowery Branch, GA (US); Robert F. Bent, Gainesville, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/098,051

(22) Filed: Apr. 4, 2005

(65) Prior Publication Data

US 2005/0189829 A1    Sep. 1, 2005

Related U.S. Application Data

(62) Division of application No. 10/645,231, filed on Aug. 21, 2003.

(60) Provisional application No. 60/471,989, filed on May 20, 2003.

(51) Int. Cl.
*H02K 5/22* (2006.01)
*H02K 5/24* (2006.01)

(52) U.S. Cl. ............................ 310/71; 310/239; 310/43

(58) Field of Classification Search ................. 310/43, 310/239, 71, DIG. 6; 74/425
See application file for complete search history.

(56) References Cited

U.S. PATENT DOCUMENTS

| | | | |
|---|---|---|---|
| 3,924,147 A | 12/1975 | Tarnow et al. ................. | 310/68 |
| 4,329,605 A | 5/1982 | Angi et al. .................... | 310/68 |
| 4,384,223 A | 5/1983 | Zelt .............................. | 310/68 |
| 4,494,024 A | 1/1985 | Braun .......................... | 310/75 |
| 4,600,971 A | 7/1986 | Rose et al. .................. | 361/421 |
| 4,727,274 A * | 2/1988 | Adam et al. ................. | 310/239 |
| 4,895,536 A | 1/1990 | Gingerich et al. .......... | 439/885 |
| 5,196,750 A | 3/1993 | Strobl ......................... | 310/239 |
| 5,287,028 A | 2/1994 | Suzuki et al. ................ | 310/71 |
| 5,311,398 A | 5/1994 | Schirmer et al. ........... | 361/704 |
| 5,313,126 A | 5/1994 | Forsythe et al. ............. | 310/51 |
| 5,409,399 A | 4/1995 | Geoghegan et al. ........ | 439/567 |
| 5,723,924 A * | 3/1998 | Blanchet ..................... | 310/85 |
| 5,879,785 A | 3/1999 | Shin ........................... | 428/209 |

(Continued)

FOREIGN PATENT DOCUMENTS

WO    00/38300    6/2000

*Primary Examiner*—Karl Tamai

(57) ABSTRACT

A permanent magnet DC motor 10 having electromagnetic interference (EMI) suppression includes a metal motor housing 12 and a brush card assembly 34. The brush card assembly includes brushes 20 and leads 24 constructed and arranged to be coupled with a source of power to power the motor. A brush card housing 14 has a first portion 18 housing the brushes and a second portion 22, integral with the first portion, and housing the leads. A printed circuit board 26 is mounted with respect to the second portion of the housing and carries at least one electromagnetic interference (EMI) suppression component 30 constructed and arranged to suppress EMI generated by the motor. The leads are electrically connected to the printed circuit board so that current can be provided through the printed circuit board to the brushes. A contact member 40 is electrically connected between the printed circuit board and the metal motor housing so that the at least one EMI suppression component couples the brushes to the metal motor housing thereby causing the metal motor housing to become an AC ground and EMI shield.

7 Claims, 4 Drawing Sheets

U.S. PATENT DOCUMENTS

| | | | |
|---|---|---|---|
| 6,020,661 A * | 2/2000 | Trago et al. | 310/43 |
| 6,078,117 A | 6/2000 | Perrin et al. | 310/68 |
| 6,099,324 A | 8/2000 | Janssen et al. | 439/76.1 |
| 6,162,381 A | 12/2000 | Onishi et al. | 264/157 |
| 6,400,058 B1 | 6/2002 | Liau | 310/239 |
| 6,528,915 B1 | 3/2003 | Moskob | 310/71 |

* cited by examiner

EMI SUPPRESSION IN PERMANENT MAGNET DC MOTORS HAVING PCB OUTSIDE MOTOR IN CONNECTOR AND OVERMOLDED

This is a divisional of application Ser. No. 10/645,231 filed Aug. 21, 2003 which is hereby incorporated by reference.

This application is based on U.S. Provisional Application No. 60/471,989, filed on May 20, 2003, and claims the benefit thereof for priority purposes.

FIELD OF THE INVENTION

The invention relates to permanent magnet DC motors for automotive applications and, more particularly, to Electro-Magnetic. Interference (EMI) suppression of DC motors using a Printed Circuit Board (PCB) mounted in a connector located outside of the motor.

BACKGROUND OF THE INVENTION

Automobiles contain more electric motors with every new model year. DC motors are used for a variety of functions such as for controlling windshield wipers, power windows, power sunroofs and power seat adjustments. At the same time that these motors are proliferating in vehicles, more and more sensitive electronics are being installed or used in or around vehicles. DC brush motors generate a significant amount of EMI. The electronics in vehicles, such entertainment systems, and embedded controllers, along with electronic devices used around vehicles such as cell phones and other wireless devices are sensitive to the EMI generated by DC brush motors. Automobile manufacturers are requiring motors with lower EMI emissions over wider frequency ranges for use in vehicles. At the same time, motor manufacturers are under continuous pressure to reduce the price of their motors.

Thus, there is a need to provide a DC motor with improved EMI suppression while reducing the cost of DC motors having such suppression.

SUMMARY OF THE INVENTION

An object of the present invention is to fulfill the need referred to above. In accordance with the principles of the present invention, this objective is obtained by providing a permanent magnet DC motor having electro-magnetic interference (EMI) suppression includes a metal motor housing and a brush card assembly. The brush card assembly includes brushes and leads constructed and arranged to be coupled with a source of power to power the motor. A brush card housing has a first portion housing the brushes and a second portion, integral with the first portion, and housing the leads. A printed circuit board is mounted with respect to the second portion of the housing and carries at least one electro-magnetic interference (EMI) suppression component constructed and arranged to suppress EMI generated by the motor. The leads are electrically connected to the printed circuit board so that current can be provided through the printed circuit board to the brushes. A contact member is electrically connected between the printed circuit board and the metal motor housing so that the at least one EMI suppression component couples the brushes to the metal motor housing thereby causing the metal motor housing to become an AC ground and EMI shield.

In accordance with another aspect of the invention, a method of providing electro-magnetic interference (EMI) suppression for a permanent magnet DC brush motor includes the step of:

providing a permanent magnet DC motor having a metal housing, brushes, and connector structure extending outside of the metal housing, the connector structure housing leads to power the motor, mounting a printed circuit board within the connector structure, the printed circuit board having at least one EMI suppression component for suppressing EMI of the motor, electrically connecting the leads to the printed circuit board so that current can be provided through the printed circuit board to the brushes, providing a contact member electrically connected between the printed circuit board and the metal housing so that the at least one EMI suppression component couples the brushes to the metal housing thereby causing the metal motor housing to become an AC ground and EMI shield, and molding a plastic material over the printed circuit board to cover the circuit board.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE EXEMPLARY EMBODIMENT

The invention relates to mounting Surface Mounted Device (SMD) Electromagnetic Compatibility (EMC) Components on a Printed Circuit Board (PCB) outside a motor case/brushcard assembly, in a connector that connects with a harness and with direct connections to a lead-frame. The PCB is then over-molded using an existing process.

Figure 1:
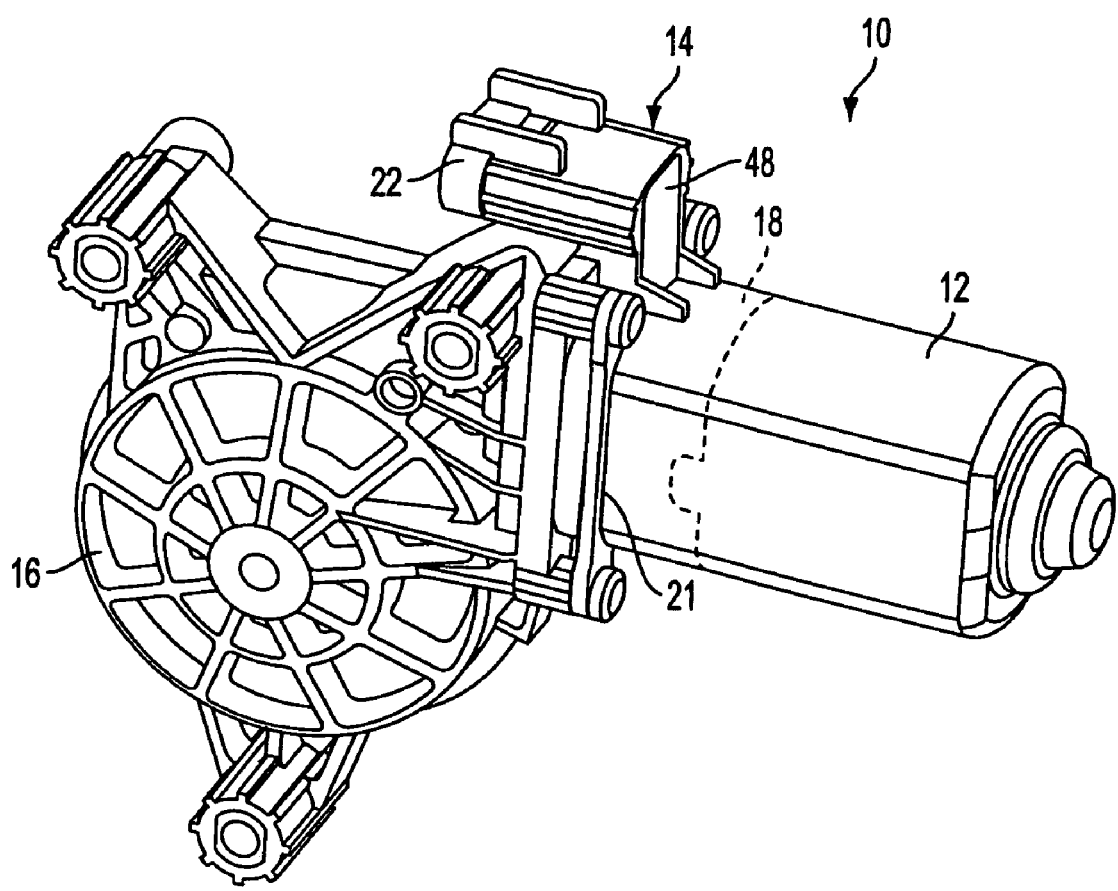
FIG. 1 is a front perspective view of a permanent magnet DC brush motor having. EMI suppression, provided in accordance with the principles of the present invention.

A permanent magnet DC motor with EMI suppression is shown, generally indicated at 10, in FIG. 1 in accordance with the principles of the invention. The DC motor 10 includes a metal motor housing 12, containing the conventional permanent magnets, commutator, armature, shaft, and windings (all not shown), and a brush card housing, generally indicated at 14, containing the conventional brushes 20 and motor leads 24 (see FIG. 3). In the illustrated embodiment, the motor 10 is a windowlift motor for moving a vehicle window and thus also includes a gear housing connected with the motor housing 12 that contains the appropriate gearing to operate a power window. It can be appreciated that the invention applies to any permanent magnet DC brush motor.

Figure 2:
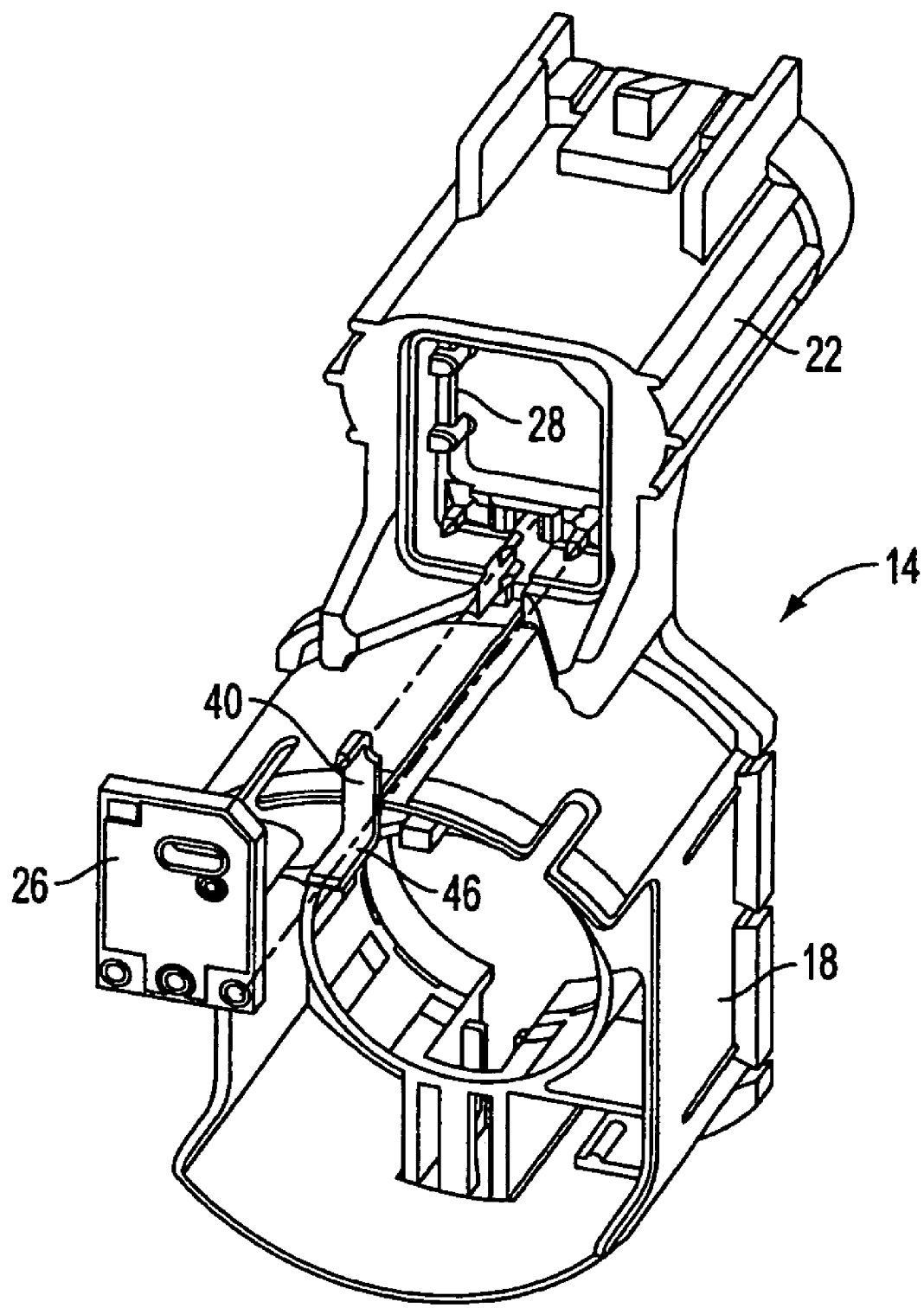
FIG. 2 is an enlarged perspective view of a brush card housing of the motor of FIG. 1, shown with a PCB ready to be inserted into an upper portion thereof.
Figure 3:
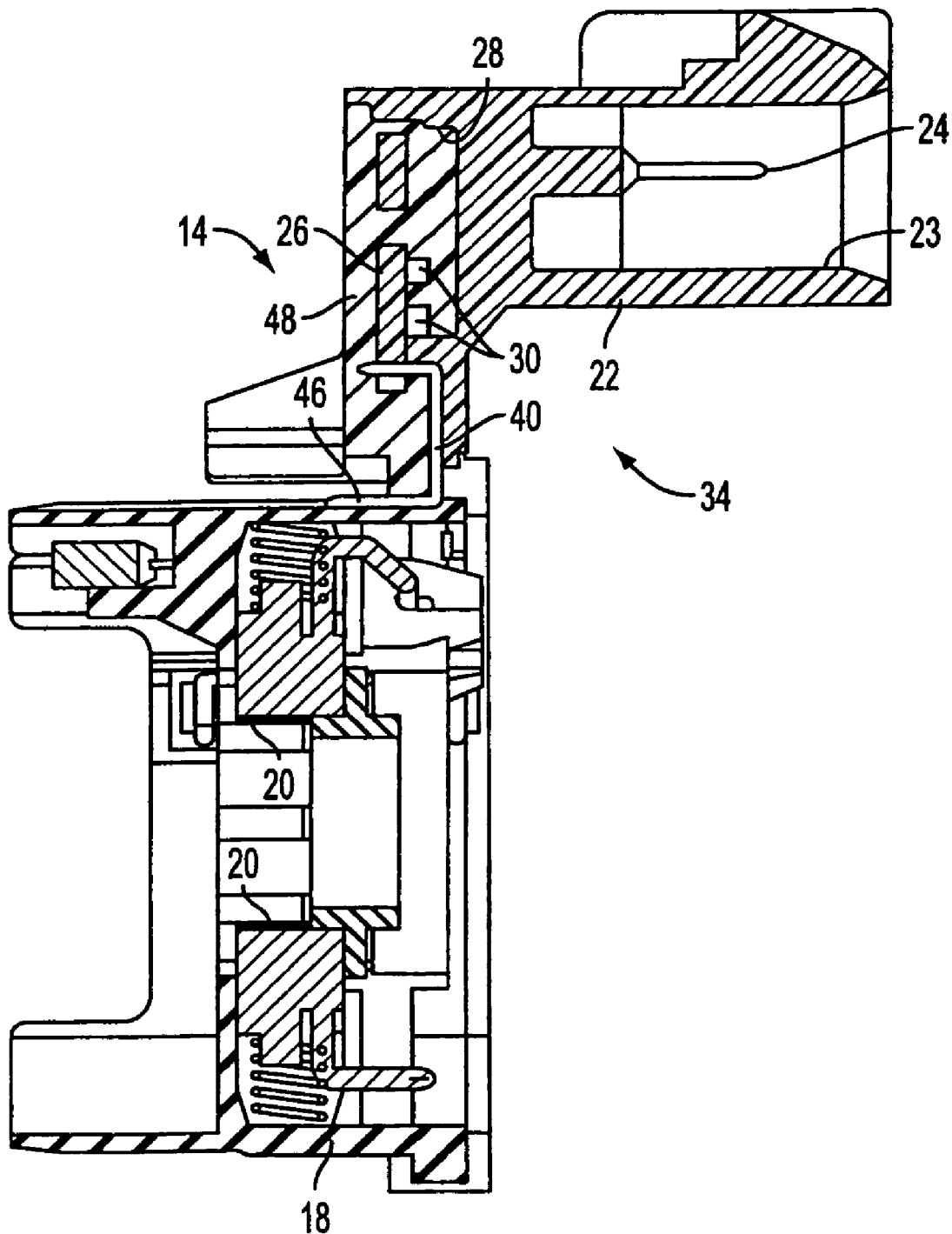
FIG. 3 is a sectional view of the brush card housing of the motor of FIG. 1, shown with the brushes, PCB, and leads installed therein.
Figure 4:
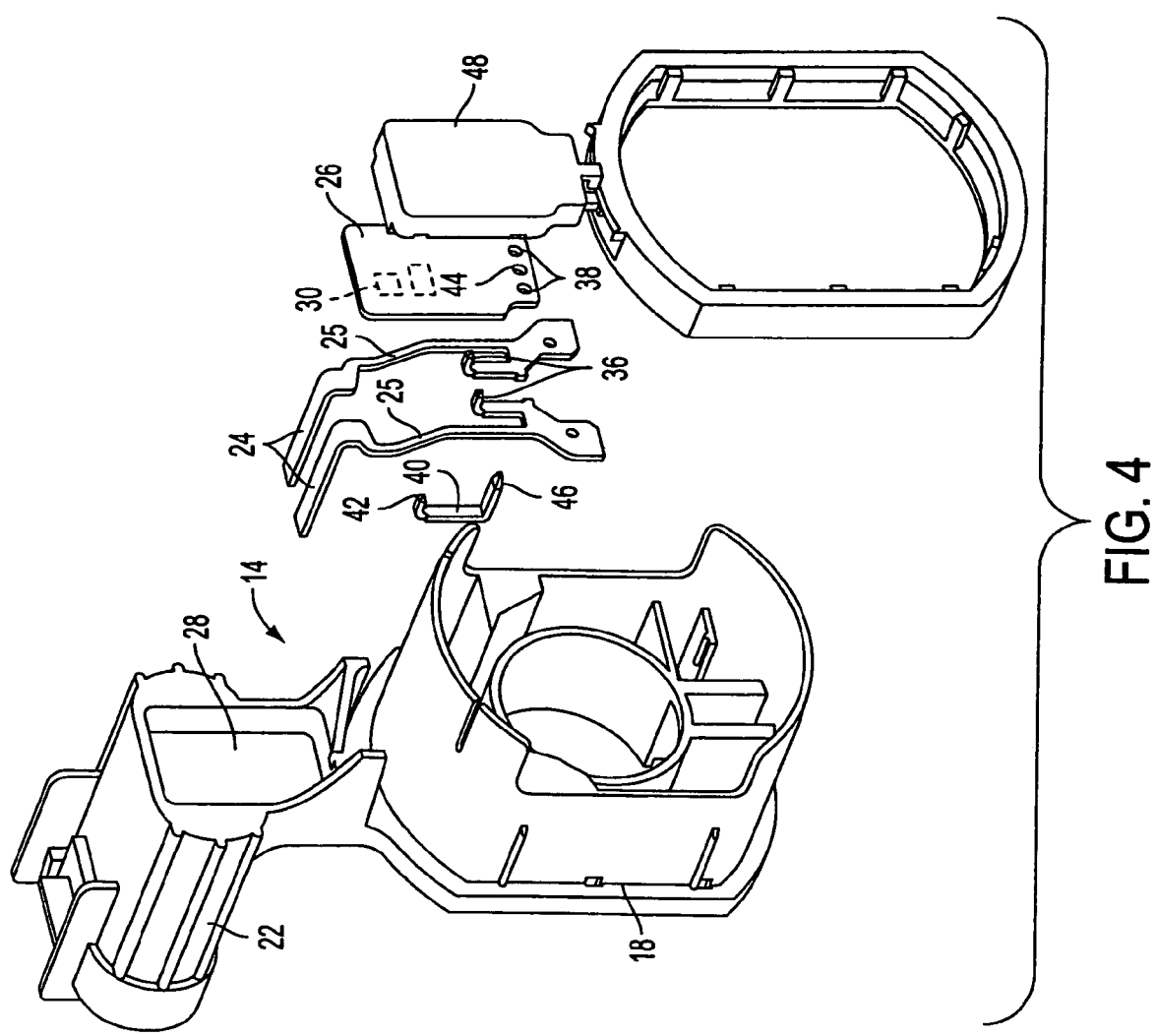
FIG. 4 is an exploded view of the brush card housing, contact pin, leads, PCB and over-molded cover in accordance with the invention.

With reference to FIGS. 2–4, the brush card housing 14 includes a first portion 18 containing conventional brushes 20 and a second portion, defining connector structure 22. The connector structure 22 includes a connector body 23 that is preferably integral with the first portion 18 and houses leads 24 for powering the motor. When the motor is assembled, the connector structure 22 is disposed outside of the motor housing 12 and away from the first portion 18 of housing 14, the function of which will be explained below. The first portion 18 of housing 14 is received within an open end 21 the motor housing 12 so that the brushes 20 are operatively associated with the commutator (not shown) of the motor. In the broadest aspect of the invention, the first portion 18 of the brush card housing 14 can be considered to be part of the motor housing 12.

In the illustrated embodiment, a printed circuit board (PCB) 26 is mounted within a recess 28 defined in the connector structure 22 of the housing 14. The PCB 26 carries EMI suppression components 30 (FIGS. 3 and 4) constructed and arranged to suppress EMI generated by the motor 10. For example, the PCB 26 can include components 30 such as varistors, resistors, and capaitors, preferably surface mounted thereon. With reference to FIG. 4, ends 36 of leads 24 are soldered to surfaces defining openings 38 in the PCB 26 so that current is provided through the PCB 26 to the brushes 20. In addition, a motor contact member or pin 40 has one end 42 soldered to surfaces defining opening 44 in the PCB 26. The other end 46 of the contact pin 40 contacts an interior surface of the metal motor housing 12 when the first portion 18 of brush card housing 14 is inserted into the open end 21 of the motor housing 12 during assembly. Thus, the contact pin 40 connects the EMI suppression PCB 26 with the metal motor housing 12. The capacitors 30 on the PCB 26 couple the brushes 20 to the motor housing 12 so the motor housing 12 becomes an AC 'ground' and EMI shield.

The connector structure 22 is constructed and arranged such that the leads 24 (to be connected with a source of power such as a wiring harness) extend generally transversely with respect to the PCB 26.

A cover structure 48, preferably of plastic material, is molded over the PCB 26 to fill the recess 28 and thus protect the PCB 26. As shown in FIG. 3, the brush card housing 14 with components installed therein (e.g., brushes 20, leads 24, PCB 26) define a unitary brush card assembly 34 of the motor 10.

Thus, providing the PCB 26 in the connector structure 22 meets the need for enhanced EMI suppression while reducing manufacturing costs for DC brush motors containing suppression. The embodiment allows for improved suppression at higher frequencies than the conventional method in common use today for automotive applications, while reducing the number of manufacturing steps required to install the suppression components.

This embodiment provides the following advantages:

1. Allows for use of a small PCB without changing the mounting envelope of the motor (using already available space).

2. In the past, using a PCB just for the addition of EMI components was not cost effective for several reasons. If the PCB is mounted inside the brush-holder, the PCB assembly is exposed to high temperatures due to the proximity of the motor armature. This means higher temperature rated components must be used. Also, inside the brush-holder the PCB assembly can be exposed to brush dust and possibly residual humidity. To protect the PCB assembly, conformal coating or lacquer would be needed, requiring another expensive process. Mounting the PCB 26 in the connector structure 22 and over-molding the assembly during the process already in place eliminates the need for conformal coating, and higher temperature rated components.

3. The PCB allows for the use of SMD suppression devices that are effective to higher frequencies than conventional leaded components used in most motors to date. SMD components do not require special lead-forms that leaded components require for mounting in the brush card housing 14. The brush card housing 14 can be simplified since holding features for leaded components are not required. With the structure of the embodiment, all the EMI components are installed in one process step (soldering in the PCB) instead of numerous steps needed to install, bend leads, cut leads, and weld leads for the conventional leaded components. In addition, different EMI configurations can be produced with no change in the brush-holder assembly process, simply by changing which components are soldered on the PCB, or the PCB can simply not be installed on motors that do not require EMI suppression.

The location of the PCB 26, close to and parallel to the legs 25 of the leads 24, utilizes already available space, and provides for soldering the PCB 26 directly to the lead ends 36 that greatly improves the effectiveness of the EMI suppression components. Additionally, the location of the PCB next to the motor housing 12 allows for a very short lead 40 from the PCB assembly to the motor housing, also enhancing the EMI suppression of the motor 10.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims

What is claimed is:

1. A method of providing electro-magnetic interference (EMI) suppression for a permanent magnet DC brush motor, the method including the steps of:

providing a permanent magnet DC motor having a metal housing, brushes, and connector structure extending outside of the metal housing, the connector structure housing lead structure to power the motor, the lead structure having lead ends, connecting ends, and leg portions between the lead ends and the connecting ends, mounting a printed circuit board within the connector structure, the printed circuit board having at least one EMI suppression component for suppressing EMI of the motor, electrically connecting the connecting ends of the lead structure to the printed circuit board so that current can be provided through the printed circuit board to the brushes, providing a contact member electrically connected between the printed circuit board and the metal housing so that the at least one EMI suppression component couples the brushes to the metal housing thereby causing the metal motor housing to become an AC around and EMI shield, and molding a plastic material over the printed circuit board to cover a surface of the printed circuit board, with the plastic material defining an outermost cover for the printed circuit board, wherein the step of molding over plastic material includes molding over plastic material to cover an entire surface of the printed circuit board.

2. A method of providing electro-magnetic interference (EMI) suppression for a permanent magnet DC brush motor, the method including the steps of:

providing a permanent magnet DC motor having a metal housing, brushes, and connector structure extending outside of the metal housing, the connector structure housing lead structure to power the motor, the lead structure having lead ends, connecting ends, and leg portions between the lead ends and the connecting ends, mounting a printed circuit board within the connector structure, the printed circuit board having at least one EMI suppression component for suppressing EMI of the motor, electrically connecting the connecting ends of the lead structure to the printed circuit board so that current can be provided through the printed circuit board to the brushes, providing a contact member electrically connected between the printed circuit board and the metal housing so that the at least one EMI suppression component couples the brushes to the metal housing thereby causing the metal motor housing to become an AC around and EMI shield, and molding a plastic material over the printed circuit board to cover a surface of the printed circuit board, with the plastic material defining an outermost cover for the printed circuit board, wherein the connector body includes a recess, the circuit board being mounted to the connector body within the recess, the step of molding over plastic material includes filling the recess with plastic material and covering an entire surface of the printed circuit board.

3. The method of claim 1, wherein the step of electrically connecting the connecting ends includes ensuring that the lead ends extend generally transversely with respect to the leg portions.

4. The method of claim 1, wherein the step of electrically connecting the connecting ends includes soldering the connecting ends to the printed circuit board.

5. The method of claim 1, wherein the step of electrically connecting the connecting ends includes ensuring that the leg portions are generally parallel with the printed circuit board.

6. The method of claim 1 wherein the EMI suppression component is a surface mounted device soldered to the printed circuit board.

7. The method of claim 1, wherein the EMI suppression component includes a capacitor.

* * * * *